United States Patent [19]

Izumo

[11] Patent Number: 5,439,659
[45] Date of Patent: Aug. 8, 1995

[54] METHOD FOR TREATING EXHAUST GAS AND AN APPARATUS THEREFOR

[75] Inventor: Masanori Izumo, Settsu, Japan

[73] Assignee: Daikin Industries, Ltd., Osaka, Japan

[21] Appl. No.: 50,227

[22] PCT Filed: Sep. 3, 1992

[86] PCT No.: PCT/JP92/01126
§ 371 Date: May 5, 1993
§ 102(e) Date: Sep. 17, 1993

[87] PCT Pub. No.: WO93/04766
PCT Pub. Date: Mar. 18, 1993

[30] Foreign Application Priority Data
Sep. 5, 1991 [JP] Japan .................. 3-226237

[51] Int. Cl.$^6$ .............................. B01D 53/34
[52] U.S. Cl. .................. 423/245.1; 422/169; 422/170; 422/172; 423/244.22; 423/239.2; 423/210
[58] Field of Search ............... 422/169, 170, 172, 176, 422/178, 171; 423/230, 239.2, 244.11, 235, 210, 244.08, 240 S, 245.1; 95/61, 902, 148; 96/27, 143, 146

[56] References Cited

U.S. PATENT DOCUMENTS

| | | | |
|---|---|---|---|
| 1,331,225 | 2/1920 | Wolcott ..................... | 95/61 |
| 3,212,878 | 10/1965 | Bouteille .................... | 95/61 |
| 4,226,831 | 10/1980 | Dilworth ..................... | 422/176 |
| 4,246,242 | 1/1981 | Butler et al. ............... | 423/210 |
| 4,425,143 | 1/1984 | Nishizawa et al. ......... | 422/169 |
| 5,013,335 | 5/1991 | Marcus ..................... | 95/902 |
| 5,032,360 | 7/1991 | Houston .................... | 423/230 |

FOREIGN PATENT DOCUMENTS

| | | |
|---|---|---|
| 0021558 | 1/1981 | European Pat. Off. . |
| 0196481 | 10/1986 | European Pat. Off. . |
| 0253563 | 1/1988 | European Pat. Off. . |
| 0405290 | 1/1991 | European Pat. Off. . |
| 2201249 | 9/1972 | France ........... B01D 53/00 |
| 4002554 | 8/1991 | Germany . |
| 49-133294 | 12/1974 | Japan . |
| 52-91790 | 8/1977 | Japan . |
| 52-92877 | 8/1977 | Japan . |
| 53-147693 | 12/1978 | Japan . |
| 60-51532 | 3/1985 | Japan . |
| 2122812 | 5/1990 | Japan . |
| 91/01792 | 2/1991 | WIPO . |

Primary Examiner—Robert J. Warden
Assistant Examiner—Hien Tran
Attorney, Agent, or Firm—Wenderoth, Lind & Ponack

[57] ABSTRACT

A powdery adsorbent is mixed with an exhaust gas containing fine particles and a noxious and malodorous gas component in gas pipelines, adhering the fine particles to the powdery adsorbent and adsorbing the noxious and malodorous gas with the powdery adsorbent. The powdery adsorbent is then fed to dust collectors where the exhaust gas is separated from the powdery adsorbent and is purified. The separated powdery adsorbent comes in contact with a hot blast at a high temperature, or else is indirectly heated in a pipeline and the adsorbed gas is thereby desorbed. Further, a part of or all of the desorbed powdery adsorbent comes in contact with a hot blast at a higher temperature than the above mentioned temperature, or is indirectly heated in a pipeline, and thereby the fine particles adhered to the powdery adsorbent are thermally decomposed. In this way, the powdery adsorbent is regenerated, and can be returned to be mixed with the exhaust gas in order to be reused.

24 Claims, 6 Drawing Sheets

METHOD FOR TREATING EXHAUST GAS AND AN APPARATUS THEREFOR

BACKGROUND OF THE INVENTION (1) Technical Field

The present invention relates to a method for treating an exhaust gas and an apparatus therefor which can efficiently carry out a treatment of separating a noxious and malodorous gas and concentrating the gas to a small flux. The method is for treating low concentration exhaust gases containing fine particles and a noxious and malodorous gas component, such as exhaust gases from car coating. In low concentration exhaust gases containing fine particles and a noxious and malodorous gas, the fine particles, for example plasticizers, higher fatty acids, lampblack, pitch, etc., may deteriorate an adsorbent. Such exhaust gas is also produced in printing, steel pipe production presses, etc.

The meaning of "fine particles" as mentioned in the specification includes, generally, adhesive dust, mist and particulate high boiling point substances. "Mist" means liquid fine particles, and the "high boiling point substances" mean a high boiling point gas and a high boiling point mist.

(2) Background Art

A so-called deodorizer for separating a noxious and malodorous gas from an exhaust gas containing a low concentration noxious and malodorous gas such as organic solvents, etc., is widely used in manufacturing processes in various industries. A typical prior art example of a deodorizing treatment of this type appears in FIG. 1 as an apparatus for treating an exhaust gas from a car coating process.

Figure 1:
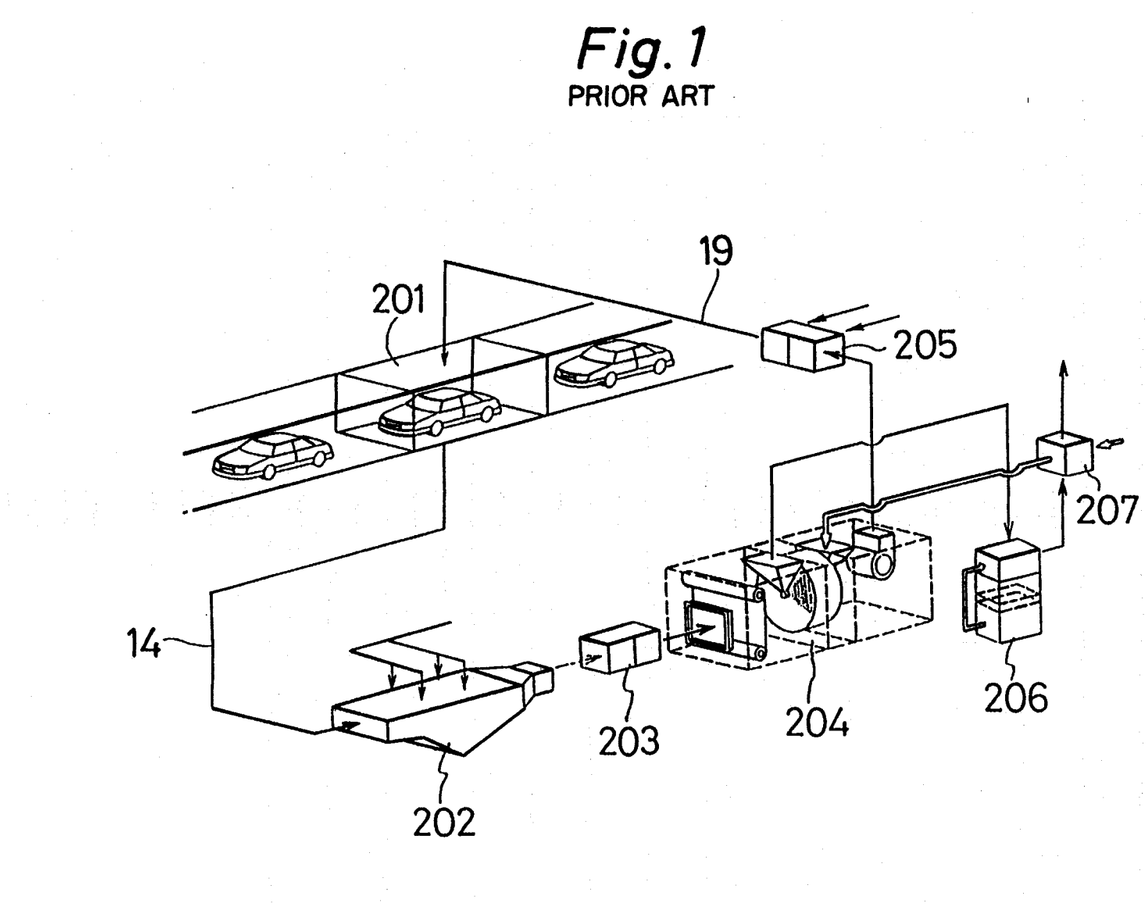
FIG. 1 is a system diagram of an exhaust gas treating system in car coating in the prior art.

A coating booth 201 in a line for coating car chassis generates an exhaust gas containing adhesive dust consisting of very fine paint residue with a not more than 10 μm particle diameter and a noxious and malodorous gas component such as organic solvents. This exhaust gas needs to be purified. Therefore, the exhaust gas is dusted by initially passing the exhaust gas through a wet static dust collector 202 via an exhaust pipeline 14. At this time, for preventing dust from sticking to the electrodes, a sprinkling on the dust collector electrodes is performed. The dusted exhaust gas is fed to a humidity/temperature regulator 203 to be dehumidified and adjusted in temperature. Thereafter, the noxious and malodorous gas component of the exhaust gas is concentrated and separated in a honeycomb type concentration apparatus 204. The purified and treated air is again fed to the coating booth 201, passing through another humidity/temperature regulator 205 via a pipeline 19. The noxious and malodorous gas concentrated by the concentration apparatus 204, after being separated, is discharged out of the room through a heat recovering and exchanging device 207 as an exhaust gas after being neutralized by oxidation treatment in a catalytic oxidation apparatus 206.

As apparatuses for direct treatment of an exhaust gas, there are available directly firing furnaces, catalytic oxidization apparatuses, adsorptive recovery systems, chemical solution cleaning systems, etc. These apparatuses become further economically disadvantageous with decreasing concentrations of contaminants. As treatment systems combining small devices, with the exhaust gas once concentrated to provide a small flux, of primary interest now is the above-described concentration apparatus 204 making use of a rotor formed in a honeycomb shape of an adsorbent such as activated charcoal, etc. This apparatus is advantageous in its excellent operational economy, but involves the below-mentioned problems.

Because the adsorbent is formed into a honeycomb shaped rotor, the cost of the apparatus is over ten times as high as the material adsorbent. Moreover, because the adsorbent is formed in an admixture with an organic binder and auxiliary materials, its reactivation is difficult when its adsorptive performance has deteriorated. Furthermore, because of its heating system using hot blast for regeneration in order to concentrate the exhaust gas, indirect heating is not applicable. As a consequence, the degree of concentration is limited to 10 to 15 times on account of the heating calories for the honeycomb rotor, and simultaneous heating of not only the adsorbent, but other combined members, like the auxiliary materials, etc., is necessary, thus requiring large heating calories therefor.

Particularly, in the case of the treatment of the exhaust gas from car coating, because of the adhesive dust being contained in the exhaust gas, this adhesive dust sticks on the surface of the honeycomb shaped rotor, thereby blocking the rotor, and resulting in an extremely lowered adsorptive performance. This necessitates its combination with a wet static dust collector 202 with a high performance and high price, raising the problem of a high overall cost of the equipment.

On the other hand, the exhaust gas produced in printing processes contains high boiling point substances, such as plasticizers and wood tar, which could deteriorate the adsorbent forming the honeycomb shaped rotor. This necessitates the use of an expensive floor-fixed type adsorption tower as pretreatment equipment, which also increases the overall cost of the equipment.

OBJECTION OF THE INVENTION

It is, accordingly, an object of the present invention to provide a method and apparatus for exhaust gas treatment which can realize a highly efficient exhaust gas treatment in a high concentration state using a compact structure and at a low running cost, wherein a noxious and malodorous gas in the exhaust gas is efficiently removed by adsorption.

SUMMARY OF THE INVENTION

The present invention is provided with means to achieve the above object.

The present invention provides a method for treating exhaust gas containing fine particles having organic compounds as a main component and a noxious and malodorous gas, which comprises the steps of:

mixing a powdery adsorbent into the exhaust gas to adsorb the noxious and malodorous gas, separating the powdery adsorbent from the exhaust gas after the mixing step, regenerating the separated powdery adsorbent by heating the powdery adsorbent to desorb the noxious and malodorous gas from the separated powdery adsorbent, and returning the powdery adsorbent regenerated at the regenerating step so as to be utilized in the mixing step.

Also, the invention provides an apparatus for treating an exhaust gas containing fine particles having organic compounds as a main component and a noxious and malodorous gas, which comprises:

means for adsorbing the noxious and malodorous gas, the adsorbing means comprising (a) a means for mixing a powdery adsorbent into the exhaust gas, and (b) a means for separating the powdery adsorbent from the exhaust gas conveyed from the mixing means, means for regenerating the powdery adsorbent by heating the powdery adsorbent separated by the separating means to desorb the noxious and malodorous gas from the separated powdery adsorbent, and means for conveying for returning the regenerated powdery adsorbent to the mixing means.

In a preferred embodiment, the powdery adsorbent is implemented by a powder of hydrophobic zeolite.

In another preferred embodiment, the separating means comprises first and second dust separating devices connected in a series to convey the exhaust gas separated by the first dust separating device to the second dust separating device and disposed so as to convey a part of the powdery adsorbent separated by the first and second dust separating devices to the mixing means prior to the first dust separating device. The conveying means is disposed to return the powdery adsorbent regenerated by the regenerating means to an inlet side of the second dust separating device.

In still another preferred embodiment, the separating means comprises three or more dust separating devices connected in series to convey the exhaust gas separated by each of the dust separating devices to the next dust separating device disposed downstream of the former dust separating device and disposed so as to convey the powdery adsorbent separated by the first dust separating device to the regenerating means and to return the powdery adsorbent separated by each of other dust separating devices, except the first dust separating device, to an inlet side of the former dust separating device disposed just before each of the dust separating devices. The conveying means is disposed to return the powdery adsorbent regenerated by the regenerating means into an inlet side of the last dust separating device.

In a further preferred embodiment, the regenerating means comprises:

means for heating the powdery adsorbent separated by the separating means at a first temperature by indirectly heating or directly heating a mixture of the separated powdery adsorbent with a regeneration gas to desorb the noxious and malodorous gas from the separated powdery adsorbent, and means for heating a part of all of the powdery adsorbent adsorbed by the first high temperature heating means at a second temperature higher than the first temperature by indirectly heating or directly heating a mixture of the desorbed powdery adsorbent with a gas at the second temperature to thermally decompose the fine particles adhering to the desorbed powdery adsorbent.

In a still further preferred embodiment, the apparatus further comprises means for electrostatically charging the powdery adsorbent conveyed from the regenerating means to the mixing means.

In a still further preferred embodiment, the conveying means is a means for pneumatically conveying the powdery adsorbent by a cool blast process.

In yet a further preferred embodiment, the apparatus further comprises means for neutralizing and deodorizing the noxious and malodorous gas concentrated by the regenerating means by collection and/or oxidative degradation of the noxious and malodorous gas.

In a still further preferred embodiment, the neutralizing and deodorizing means is implemented by an adsorption type collecting device.

In a still further preferred embodiment, the neutralizing and deodorizing means is implemented by an oxidative degradation device.

According to the present invention, by mixing the exhaust gas and a powdery adsorbent with each other in the conveying step using a pneumatic conveying means, a highly efficient adsorption of gas components and adhesion of fine particles, in a state of direct contact with each other, are effected. On account of this, the adsorbing treatment may be performed with a simple construction of pneumatic conveyance pipelines, so that such complex mechanisms such as honeycomb type concentration devices, etc., may be omitted.

From the adsorbent on which the adsorption and adhesion have been made, after being separated from the exhaust gas by a separating means such as a bag filter, cyclone or the like, the noxious and malodorous gas are desorbed in a small flux of gas for regeneration that is fed in by an indirect heating means such as a rotary kiln and a ribbon mixer or by indirect heating such as bringing into contact with a hot blast. This yields a regenerated powdery adsorbent, which is returned to the pneumatic conveying means used in the adsorbing step.

Efficient desorption is permitted to be made with only a small flux of gas for regeneration being required. The desorbed concentrated gas is in a highly concentrated state, so that it may be neutralized by the use of small scale combustion equipment or small collecting equipment when disposing of the concentrated gas.

The fine particles adhering to the powdery adsorbent are continuously or periodically removed by a separately installed heating device. The malodorous gas generated by the heating device is disposed of by any combustion apparatus. The ash from the fine particles which have accumulated during repetitive heating treatment may be separated by periodically putting the adsorbent into a water tank and taking advantage of the sp.gr. difference. The purified adsorbent may be reused after drying.

Further, according to the preferred embodiment, when the regenerating means comprises a low temperature heat treating means and a high temperature heat treating means, the adsorbent laden with adsorptives and adhesives is separated for the exhaust gas by separating means including a cyclone separator, bag filter, etc. Thereafter, the desorption and separation of the noxious and malodorous gas and the thermal decomposition of the fine particles are performed by the low temperature heat treating means and the high temperature heat treating means, and the adsorbent regenerated by the treatment through the two kinds of heat treating means is mixed into the exhaust gas and is thus reused for exhaust gas treatment.

In regenerating the adsorbent, the temperature conditions for regeneration are different between the treatment of the noxious and malodorous gas and the treatment of the fine particles. The temperature range suitable for the desorption of the noxious and malodorous gas is 120° to 250° C., in which range the noxious and malodorous gas can be desorbed from the adsorbent. On the other hand, in the case of the fine particle, for example, paint mist, oxidative degradation is required in addition to thermal decomposition. Decomposition will become noticeable from around 250° C. but for complete decomposition, high temperatures of 350° to 600° C. will be needed. In the case of high boiling point substances, the conditions vary depending on the natures of the substances, but generally, desorption is accomplished at temperatures of 250° to 350° C., and part of the substances are thermally decomposed to produce tar or carbon. Considering the above, temperatures from 350° to 600° C. are needed for regeneration.

The expressions "low temperature heating treatment" and "high temperature heating treatment" are intended to express the relative differences between the high and low temperatures occurring in treatment when comparing the above two heating treatments with each other. Both of the "low temperature heating treatment" and the "high temperature heating treatment" are carried out at high temperatures equal to or over 120° C.

Low temperature heat treatment is necessary for the following reasons. One reason is that, at the temperatures needed for the treatment of the fine particles, the noxious and malodorous gas could also be desorbed, but could also be ignited, as the temperature is higher than the ignition point. Since the gas concentration is very high, its combustion heat would cause the process temperature to rise considerably, which could cause trouble in the regeneration processing section due to abnormal rises in the temperature. Another reason is that in recovering the noxious and malodorous gas, low temperature treatment causes less decomposition, and make it possible to recover the products in a higher purity and in a liquid state, with a smaller content of impurities such as high boiling point substances.

For low temperature and high temperature heat treatment, a rotary kiln, ribbon mixer, or the like can be used to deliver the required heat for treatment. Such equipment can distribute heat uniformly by a pneumatic heating method, preferably by hot blast, and enhances the economy, since the high temperature gas generated from the oxidative cracker, such as a catalytic oxidization device or direct firing combustion furnace, at a later step, can be used as the heat source. The flow rate of the hot blast used for low temperature heat treatment is sufficiently small with respect to the exhaust gas, and since the noxious and malodorous gas in the exhaust gas is mixed into the hot blast while flowing at a small flow rate, the noxious and malodorous gas concentration in the mixture is greatly increased as a result of the difference in flow rates between the exhaust gas and the hot blast.

The adsorbent, after low temperature heat treatment, is heat-treated at a temperature equal to or higher than 350° C. so that the fine particles are removed by thermal decomposition as well as by oxidative degradation. The high temperature heat treating device also utilizes exhaust gas from the oxidative cracker, enhancing the economy by hot blast heating, and is desirable for uniform continuous treatment.

In the low temperature and the high temperature heat treating means, the equipment for generating the heating gas to be mixed with the adsorbent can be constructed from a pneumatic conveyance pipeline. The adsorbent is effectively heat-treated while being carried through the pneumatic conveyance pipeline into the cyclone. Also, the adsorbent is heat-treated at high temperature using a rotary kiln or a ribbon mixer.

When recovering the concentrated gas after low temperature heat treatment, the gas is introduced into a small-size solvent collecting device having a flow rate equivalent to that of the gas. In the case of neutralizing and deodorizing the gas by oxidative degradation, the gas is introduced into the oxidative cracker together with the exhaust gas after high temperature heat treatment.

The adsorbent, after heat treatment, is cooled and then returned to the adsorption pneumatic conveying means at the first adsorbing step. However, depending on the kinds of substances contained in the exhaust gas, malodorous components generated during the decomposition may remain with the adsorbent, and such malodorous components may contaminate the purified gas used as the carrier gas to transport the adsorbent. One approach to the resolution of this problem is to use a cooling device comprising a pneumatic conveying means using atmospheric air as the carrier fluid, a cyclone separator, and a bag filter, thereby providing separation between the adsorbent and the cooling air. This arrangement has the advantage that the malodorous components carried with the adsorbent are separated from the cooling air at the same time that the adsorbent is cooled. For this cooling means, a multi-step system is desirable as the cooling of the adsorbent, and the removal of the malodorous components can be accomplished in a more efficient manner when the same amount of cooling air is used.

In case the fine particles and the noxious and malodorous gas are removed simultaneously, it is to be well remembered that the removing mechanisms are different for the individual substances.

Adhesive dust from, e.g., painting can be removed by a sticking action with relative ease, as its particles collide and/or contact with the adsorbent when the particle size is not less than 10 μm, but submicron particles equal to or less than 10 μm are difficult to remove. Although high boiling point substances are often exhausted in the form of vapor from driers or the like, these are excited as they enter the treating apparatus and partly condensed to form a mist. This mist is in minute particles approximately 0.3 μm in size, which are not easy to remove by a sticking action. Meanwhile, gaseous high boiling point substances and noxious and malodorous gas can be removed with relative ease by adsorbing action.

Fine particles minutes in particle size can be electrostatically attracted and easily stuck to the powdery adsorbent when the latter is charged with static electricity as it is mixed into the pneumatic conveyance. Charging of the powdery adsorbent with static electricity can be economically done through utilization of the kinetic energy of the pneumatic conveyance. As pipe there may be used a nonconductive pipe such as a plastic pipe covered with a conductive material such as metal with a lead wire connecting it with ground or a voltage source. The adsorbent is then charged with static electricity as its airborne particles collide with the inner wall of the pipe and the like. The air pipe may preferably have many bends so that the powdery adsorbent has increased chances to collide with the pipe's inner wall. It is, however, also possible to statically charge the powdery adsorbent by ionizing the conveyance air.

Another preferred embodiment enables the noxious and malodorous gas components to be obtained in a highly concentrated state. The adsorption performance is further enhanced by making the adsorption operation a multistep cascade, using pneumatic conveying and separating means in two or more steps.

In this instance, the relationship between the concentration and the rate of adsorption of the noxious and malodorous gas gives the characteristic of the adsorbent in that the higher the concentration, the larger its adsorptive power. Accordingly, by making an adsorbent have less adsorbate, a higher adsorptive capacity contact with the exhaust gas, for a lower concentration of undesirable gas components in the exhaust gas, results. This enable the further enhancement of the adsorptive performance of the apparatus as a whole, thereby increasing the degree of concentration.

Further, according to another preferred embodiment, it is possible to conduct the adsorption during the pneumatic conveying process in the contacting relationship by supplying the adsorbent at plural positions using the single separating means and the single regeneration unit. The gas cleaning capacity can be further enhanced by bringing the highly regenerated adsorbent into contact with the gas in a final step.

Further, according to another preferred embodiment, in a process for separating the powdery adsorbent from the exhaust gas in order to highly efficiently eliminate the noxious and malodorous gas from the exhaust gas, the front step employs a cyclone and the rear step employs a dust collecting device consisting of a bag filter, etc. Adsorbent which is slightly contaminated due to adsorption is introduced into the front process of the cyclone, and the powdery adsorbent treated for regeneration in the back process of the dust collecting device is introduced in the outlet duct which connects the cyclone and the dust collecting device together.

Countercurrent contacting is preferable in order to bring the exhaust gas and powdery adsorbent into contact for adsorption. But as disclosed in the present invention, equilibrium flow is adopted as a matter of course to make their contact in the pneumatic conveyance, and judging from the parallel relation of the adsorption, a great deal of adsorbent is necessary to provide a high degree of purification to dilute the noxious and malodorous gas to several ppm or less, as described later. Therefore, in the present invention, under a condition such that the component concentration of the exhaust gas is high, like several hundred ppm, primary adsorption is carried out by bringing the exhaust gas into contact with contaminated adsorbent with which adsorption is partially conducted. Next, secondary adsorption is carried out by bringing it into contact with clean adsorbent for regeneration when the component concentration thereof becomes low, like several ten ppm. Namely, by thus making plural stepped adsorption operations, it is possible to obtain cleanly treated air from which the noxious and malodorous gas has been eliminated, from a high concentration to a remarkably low concentration such as less than several ppm. Moreover, by fully utilizing the adsorption capacity of the adsorbent, the amount of use of the adsorbent can be decreased as much as possible, the facility for the regeneration treatment can be made small in scale, and an economical exhaust gas treating operation can be achieved.

Zeolites, silica gel, sepiolites, etc., which are inorganic adsorbents, are given as examples of adsorbents to be used for the present invention. But hydrophobic zeolite is preferable. This hydrophobic zeolite is a granular powder substance of which the grain diameter is not more than 300 $\mu$m, and preferably not more than 100 $\mu$m, is an adsorbing substance which is excellent relative to organic solvents and polar odors such as ammonia, amines, mercaptans, etc., is chemically high-silica crystal, and has the characteristics of greatly adsorbing and collecting malodorous components. The characteristic details of hydrophobic zeolite, etc. are described hereinafter.

According to the present invention, a powdery adsorbent such as hydrophobic zeolite, etc., is mixed with the exhaust gas containing fine particle dust and noxious and malodorous gas components in a conveying process, such as a pneumatic conveyance, to perform adhesion and adsorption. Accordingly, this system for concentration has a high adsorption efficiency without requiring any special large dusting devices for pretreatment, like the honeycomb type concentration apparatus, for the benefit of a simplified and highly economic system of concentration.

The process of separation into the adsorbent on which the adsorption and adhesion are made and the purified gas may be performed by such universal methods as a system making use of centrifugal force or bag filters or the like because of the adsorbent being powdery, for the benefit of a simplified and sure separation.

Further, according to the present invention, since indicated heating in a small flux of gas for regeneration or direct hating by mixing the adsorbent with a hot blast of high temperature is used, only a small flux of gas for regeneration is necessary for regeneration of the adsorbent. The regeneration efficiency is improved by raising the heating temperature, and the concentration of the noxious and malodorous gas obtained by the operation for desorption is maintained high. Thus a highly concentrated noxious and malodorous gas is obtained in this way, permitting the use of an apparatus of compact structure for neutralization of the noxious gas in the deodorization is miniaturized and simplified by the embodiment of the present invention.

Furthermore, according to the present invention, fine particles are captured by getting them stuck on the powdery adsorbent, so the adhesion of the fine particles on the wall surfaces of the apparatus may be prevented. Accordingly, any dust collector, being a highpriced device, may be omitted, and removal of the fine particles from the powdery adsorbent may be performed with an adhering dust treating device which effects the heating treatment at several hundred degrees.

In a preferred embodiment, the regenerating step comprises two steps, i.e. a low temperature heating treatment and a high temperature heating treatment. The noxious and malodorous gas is separated by desorption in the first step, and the fine particles are separated by thermal decomposition in the second step. The preferred embodiment thus achieves highly efficient and stable exhaust gas treatment.

The two-step treatments with different temperature ranges also ensure extremely safe exhaust gas treatments free from dangers such as ignition of the noxious and malodorous gas.

Furthermore, since the high temperature gas generated during the exhaust gas neutralizing process if recycled for use as a heating gas for the low temperature and high temperature heating treatments, the preferred embodiment provides an excellent operating economy.

Further, another preferred embodiment may employ many steps of circulating the adsorbent. Thus, at the first step where the noxious and malodorous gas component concentration is high, the adsorption is made with the most heavily contaminated adsorbent, and at the second and following steps, where the gas has a successively smaller concentration of the components, the adsorption is made with a successively less contaminated adsorbent. Accordingly, a stable adsorption operation, not involving an excessive or an insufficient adsorbing ability, is possible, thus permitting highly concentrated gas components to be continuously obtained and efficient desorption to be made during the continuous operation for adsorption with a single regeneration unit for desorption in a multi-step system, for the benefit of a simplified apparatus.

Moreover, according to the invention, the adsorbent which has been used to adsorb, but still has sufficient adsorbing ability, is mixed with high concentration gas at the upstream side of the pneumatic conveying means, and the highly regenerated adsorbent is mixed at the downstream side thereof. Thus, the present invention has an advantage of effectively desorbing the high concentration gas by increasing the amount of adsorbent in circulation more than the amount to be processed by a regeneration unit.

According to another preferred embodiment, fine particles can be efficiently electrostatically attracted to the powdery adsorbent mixed into the exhaust gas, and it is thereby possible to have the collecting performance remarkably improved.

According to another preferred embodiment, moreover, the regenerated adsorbent which has been subject to desorption can be conveyed while being cooled, and the adsorbent which will be used in the operation for adsorption in the pneumatic conveying process can be sufficiently cooled, with the result that its adsorption efficiency is high. Moreover, the malodorous gas adsorbed by the powdery adsorbent can be easily removed by separating the cooling blast and the powdery adsorbent.

DETAILED DESCRIPTION OF THE PREFERRED EMBODIMENTS

Figure 2:
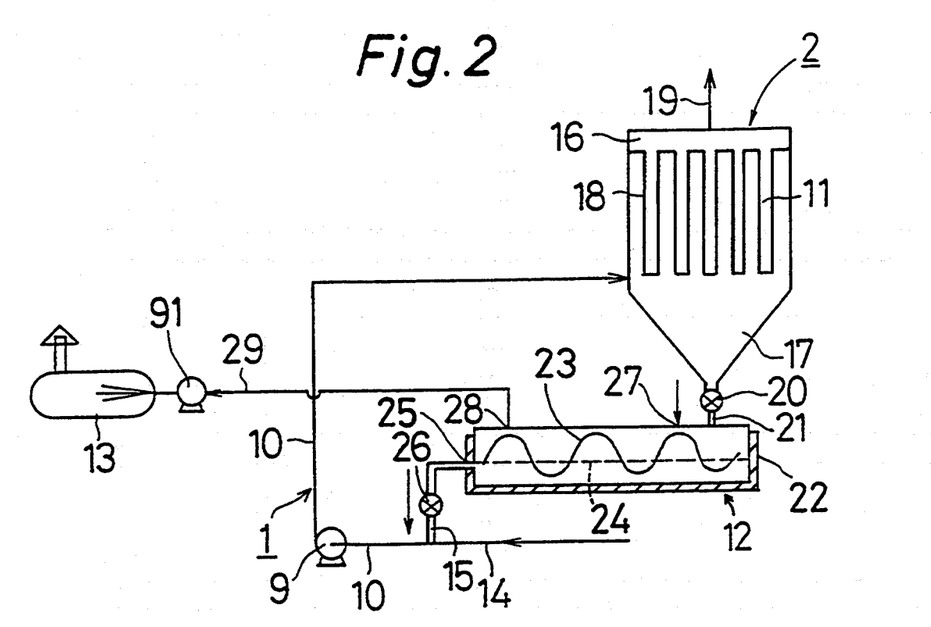
FIG. 2 is a system diagram of a first embodiment of the present invention.

The apparatus of the first embodiment shown in FIG. 2 is equipped with a pneumatic conveying means 1 provided by a pipeline 10 with a blower 9 inserted midway along the pipeline 10, separating means 2 provided by a bag filter 11, a regeneration unit provided by a ribbon stirrer 12 and a direct firing deodorizer 13.

The apparatus for treating exhaust gas according to the present invention corresponds to the apparatus for supplying exhaust gas from coating booth 201 shown in FIG. 1 through the exhaust gas pipeline 14 and exhausting purified gas after treatment through the pipeline 19. The above apparatus is embodied by replacing the wet static dust collector 202, the humidity/temperature regulators 203 and 205, the honeycomb type concentration apparatus 204, the catalytic oxidization apparatus 206 and the heat recovering and exchanging device 207 with the means and devices described hereinafter.

To the inlet side of the pipeline 10, there are connected, respectively, an exhaust gas pipeline 14 for feeding the exhaust gas containing fine particles and noxious and malodorous gas, for example exhaust gas from a car coating line, and an adsorbent feeding pipeline 15 for feeding adsorbent after it is regenerated at the ribbon stirrer 12 and fed out thereof. The outlet side of the pipeline 10 is connected to the middle part of a lower chamber 17 of the bag filter 11. The exhaust gas from the coating line, which flows through the exhaust gas pipeline 14, and the hot regenerated powdery adsorbent flowing in the adsorbent feeding pipeline 15, are mixed on the inlet side of the pipeline 10 so as to flow in the pipeline 10 via a blower 9, reaching the bag filter 11 at the outlet end of the pipeline 10. The powdery adsorbent is rapidly cooled to ordinary temperatures because of it small heat capacity. Accordingly, the noxious and malodorous gas in the exhaust gas from the coating line is efficiently adsorbed by this powdery adsorbent while passing through the pipeline 10. The adhesive dust in the exhaust gas from the coating line sticks to the powdery adsorbent, thereby being separated from the gas. As a result, the exhaust gas from the coating line has been purified, with the adhesive dust and the noxious and malodorous gas having been removed at the point of entry into the lower chamber 17.

The bag filter 11 is partitioned into an upper chamber 16 and the lower chamber 17 by a filter assembly 18 formed of a plurality of bag shaped filter cloths. A pipeline 19 is connected at one end to the top wall of the upper chamber 16, and at the other end the pipeline 19 extends to the car coating booth, for example. On the other hand, to the bottom wall of the lower chamber 17, there is joined a pipeline 21 equipped with a rotary valve 20. This pipeline 21 has a distal end connected to the inlet side of the ribbon stirrer 12.

The rotary valve 20 is a feeder having a structure capable of feeding the powder while a sealing function is performed. It is feasible to use this system with a double damper substituted for the rotary valve 20, which provides a similar effect as the rotary valve.

The exhaust gas from the coating line and the powdery adsorbent are in a mixed state, and are fed into the lower chamber 17 from the pipeline 10. The adsorbent which has the fine particles sticking thereto and the noxious and malodorous gas adsorbed thereby is collected by the filter assembly 18, and then wiped off by applying back pressure to be brought down to the bottom part of the lower chamber 17. The purified exhaust gas from the coating line passes through the filter assembly 18 and is then exhausted.

The powdery adsorbent which has fallen down to the bottom part is fed into the ribbon stirrer 12 at a predetermined rate via the rotary valve 20. In this way, the separation of the powdery adsorbent on which the fine particles stick and the noxious and malodorous gas is adsorbed from the purified gas is continuously performed in the bag filter 11.

The ribbon stirrer 12 is equipped with a horizontal cylindrical tank 22 having a jacket for circulating a heating medium formed at a circumferential wall part. A spiral shaped ribbon 23 is stored in this cylindrical tank 22 and a horizontal shaft 24 is located along the cylindrical center inside the cylindrical tank 22. The horizontal shaft 24 is rotatably driven by a motor (not shown in this figure). At the top, on one end inside of the cylindrical tank 22 (for example, the right end in FIG. 2), is joined the distal end of the pipeline 21, this one end functioning as the inlet side. In the side wall of the other end of the cylindrical tank 22, (the left end of FIG. 2) there is provided an adsorbent exit hole 25. The exit hole 25 is linked to the inlet of the pipeline 10 of the pneumatic conveying means 1 through an adsorbent feeding pipeline 15, with a valve 26 inserted midway along the pipeline 15, and thus this other end functions as the outlet. In the neighborhood of the portion where the pipeline 21 is connected on the inlet side of the cylindrical tank 22, there is provided an air inlet 27. A small flux of gas such as air, nitrogen, carbonic acid gas or the like, which may be at an ordinary temperature or heated, is fed to this air inlet 27 as a gas for regeneration.

In this ribbon stirrer 12, as the horizontal shaft 24 turns, the spiral ribbon 23 turns with the shaft 24 as the center, and moves along the inside wall of the cylindrical tank 22. By the stirring action of this ribbon 23, the powdery adsorbent fed in from the pipeline 21 progressively moves toward the outlet side along the inside wall of the cylindrical tank 22, during which time it contacts and mixes with a small flux of gas for regeneration fed from the air inlet 27. Simultaneously, it is indirectly heated to 100° to 200° C. by the heating medium inside the jacket. As a result, the adsorbent makes contact with the gas for regeneration under heat, to thereby be subjected to desorption and regeneration. This regenerated adsorbent is returned to the pipeline 10 of the pneumatic conveying means 1 via the adsorbent feeding pipeline 15 to again provide the adsorbing action.

The noxious and malodorous gas separated by desorption is discharged in a highly concentrated state and in mixture with the small flux of the gas for regeneration which has been used for the regenerating treatment through an exhaust hole 28 provided on the outlet side of the cylindrical tank 22. They are then fed to a direct firing deodorizer 13 by a blower 91 interposed between the cylindrical tank 22 and the deodorizer 13 in an exhaust pipe 29 to be neutralized by combustion treatment.

A noncombustible adsorbent is advantageous as the powdery adsorbent used in the embodiment mentioned hereabove, as it involves no hazard of a dust explosion and is, therefore, especially advantageous from a safety viewpoint. Mentioned as an example is hydrophobic zeolite with a particle diameter of not more than 300 $\mu$m, preferably not more than 100 $\mu$m, as the main component. This hydrophobic zeolite is an excellent adsorbent material to substances with polar malodorous components like organic solvents, ammonia, amines and mercaptans. Chemically, it is crystals of high-silica, and as an adsorbent has a large capacity for capturing malodorous components by adsorption.

The oxygen atoms present in the silica structure of the hydrophobic zeolite have scarce basicity and have nothing to do with the formation of hydrogen bonds. Hence Si—O—Si bonds in the surface of the zeolite show water repellency, not adsorbing the water molecules. Since it strong adsorbing capacity for polar substances is dependent upon the cation's electrostatic force corresponding to the number of aluminum atoms in the skeleton, the water repellency increases when the number of $Al_2O_3$ in the crystal is decreased and the number of $SiO_2/Al_2O_3$ is increased, and therefore the water adsorbing capacity can be decreased. The water adsorbing capacity starts decreasing when the number of $SiO_2/Al_2O_3$ has reached about 20 cc/100 g, and is decreased close to zero when its number has increased to be not less than 80 cc/100 g. Meanwhile, the absorbing capacity for ammonia, amines and mercaptans is increased when the number of $SiO_2/Al_2O_3$ is in a range of 20–80 cc/100 g, preferably 40–60 cc/100 g.

The ribbon stirrer 12 is used as a means for indirectly heating the adsorbent. Other indirect heating means may be a rotary kiln and other structures capable of heating indirectly.

Figure 3:
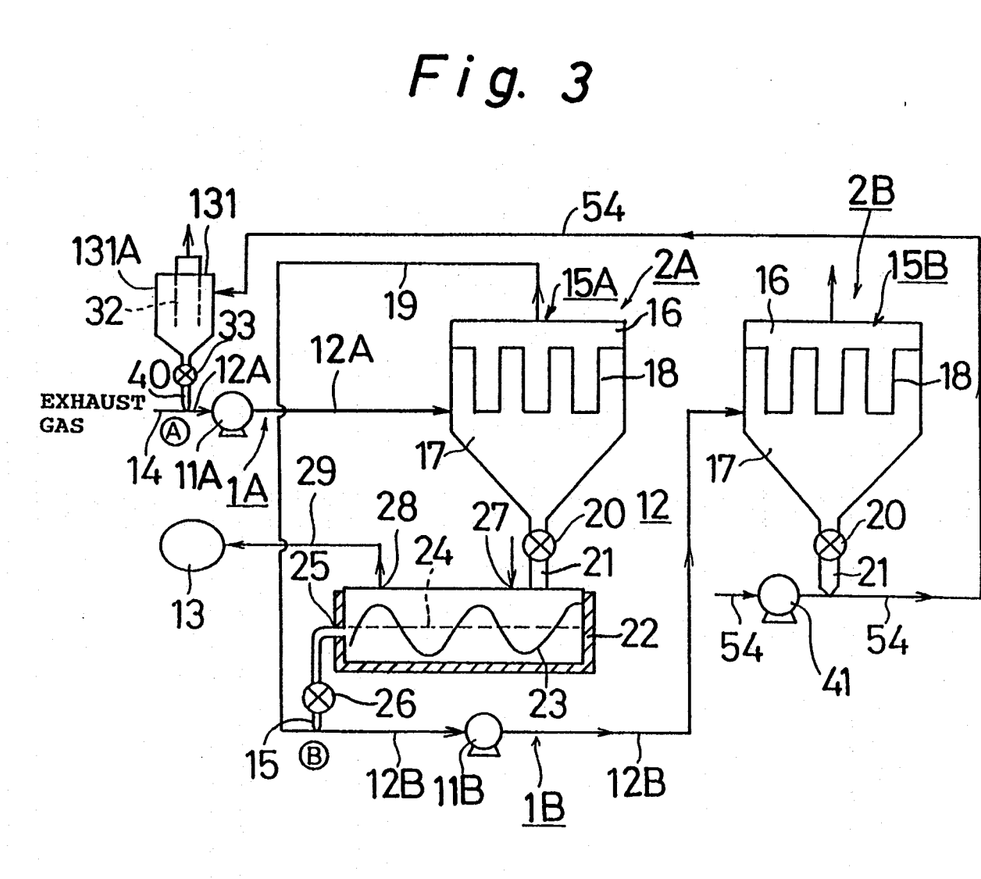
FIG. 3 is a system diagram of a second embodiment of the present invention.

FIG. 3 is a system diagram of a second embodiment of the present invention. The apparatus shown in FIG. 3 is equipped with two step separating means 2A and 2B realized by bag filters 15A and 15B, two step pneumatic conveying means 1A and 1B realized by pipeline 12A and 12B with blowers 11A and 11B inserted midway along the pipelines, respectively, a regeneration unit realized by a ribbon stirrer 12, and a cyclone 131.

In this second embodiment, since each construction and arrangements for connecting each part, such as the bag filters 15A and 15B, the ribbon stirrer 12 and the direct firing deodorizer 13, are respectively correspondent with the construction and arrangement of the bag filter 11, the ribbon stirrer 12 and the direct firing deodorizer 13 in the first embodiment, the explanation thereof is omitted.

To the inlet side of the pipeline 12A in the first step pneumatic conveying means 1A are connected, respectively, an exhaust gas pipeline 14 for feeding in the exhaust gas containing fine particles and noxious and malodorous gas, for example, exhaust gas from a car coating line, and an adsorbent feeding pipeline 40 for feeding the adsorbent after the adsorbent is regenerated at a cyclone 131 and fed out thereof. The outlet side of the pipeline 12A is connected to the middle part of the lower chamber 17 of the first step bag filter 15A. The coating exhaust gas which flows through the exhaust gas pipeline 14 and the regenerated powdery adsorbent flowing in the adsorbent feeding pipeline 40 are mixed on the inlet side of the pipeline 12A so as to flow in the pipelines 12A via a blower 11A, reaching the bag filter 15A at the outlet side of the pipeline 12A. The powdery adsorbent, having a higher temperature than the ordinary temperature, is rapidly cooled to the ordinary temperature due to its small heat capacity. Accordingly, the noxious and malodorous gas in the coating exhaust gas are efficiently adsorbed by this powdery adsorbent while passing through inside the pipeline 12A. The fine particles in the coating exhaust gas also stick to the powdery adsorbent.

As a result, the exhaust gas is purified, with the fine particles and the noxious and malodorous gas being removed at the point of entry into the lower chamber 17.

The outlet side of the pipeline 12B of the second step pneumatic conveying means 1B is linked to the middle part of the lower chamber 17 of the second step bag filter 15B. The purified gas flowing in the pipeline 19, after being separated from the adsorbent by the first step bag filter 15A, and the regenerated powdery adsorbent fed in at a predetermined rate by virtue of the rotary valve 26 through the adsorbent feeding pipeline 15, are mixed on the inlet side of the pipeline 12B and flow in the pipeline 12B via a blower 11B, reaching the second step bag filter 15B from the outlet side of the pipeline 12B. The powdery adsorbent, which has been heated to a high temperature in the ribbon stirrer 12, is rapidly cooled to the ordinary temperature due to its small heat capacity at the point when it is mixed with the purified gas. Accordingly, the noxious and malodorous gas remaining in the purified gas is adsorbed by the powdery adsorbent with high efficiency while passing through the inside of the pipeline 12B. As a result, the purified gas has a still higher degree of purification at the time when it is fed into the lower chamber 17.

The second step bag filter 15B has the same structure as the aforementioned first step bag filter 15A and provides the same action. Therefore, its detailed explanation is omitted.

The purified gas containing the adsorbent, which has been fed into the lower chamber 17 from the pipeline 12B, is separated into the adsorbent and the purified gas by the filter assembly 18, and the purified gas is then discharged to the atmosphere. The powdery adsorbent which has been captured by the filter assembly 18 and has fallen down to the bottom is fed in on an inlet side of a transport pipeline 54 at a predetermined rate via a rotary valve 20.

The transport pipeline 54 extends between the part beneath the second step bag filter 15B and the first step pneumatic conveying means 1A. The inlet end part by the second step bag filter 15B is connected to a forced draft fan 41, while the outlet end part by the first step pneumatic conveying means 1A is connected to a cyclone 131. The adsorbent fed out via the rotary valve 20 at the predetermined rate is provided to the transport pipeline 54 near its connection to the discharge side of the fan 41 so as to be fed to the cyclone 131, carried by a current for conveying, for example compressed air, discharged by the fan 41.

The adsorbent which has fallen downward and accumulated at the bottom of a body 131A of the cyclone 131 is fed out at a predetermined rate via a rotary valve 33 to be fed into the pipeline 12A of the first step pneumatic conveying means 1A. This cyclone 131 may be omitted, as the case may be. In that instance, the mixed current of adsorbent and the atmosphere carried by the transport pipeline 54 should be directly fed to the first step pneumatic conveying means 1A.

Figure 4:
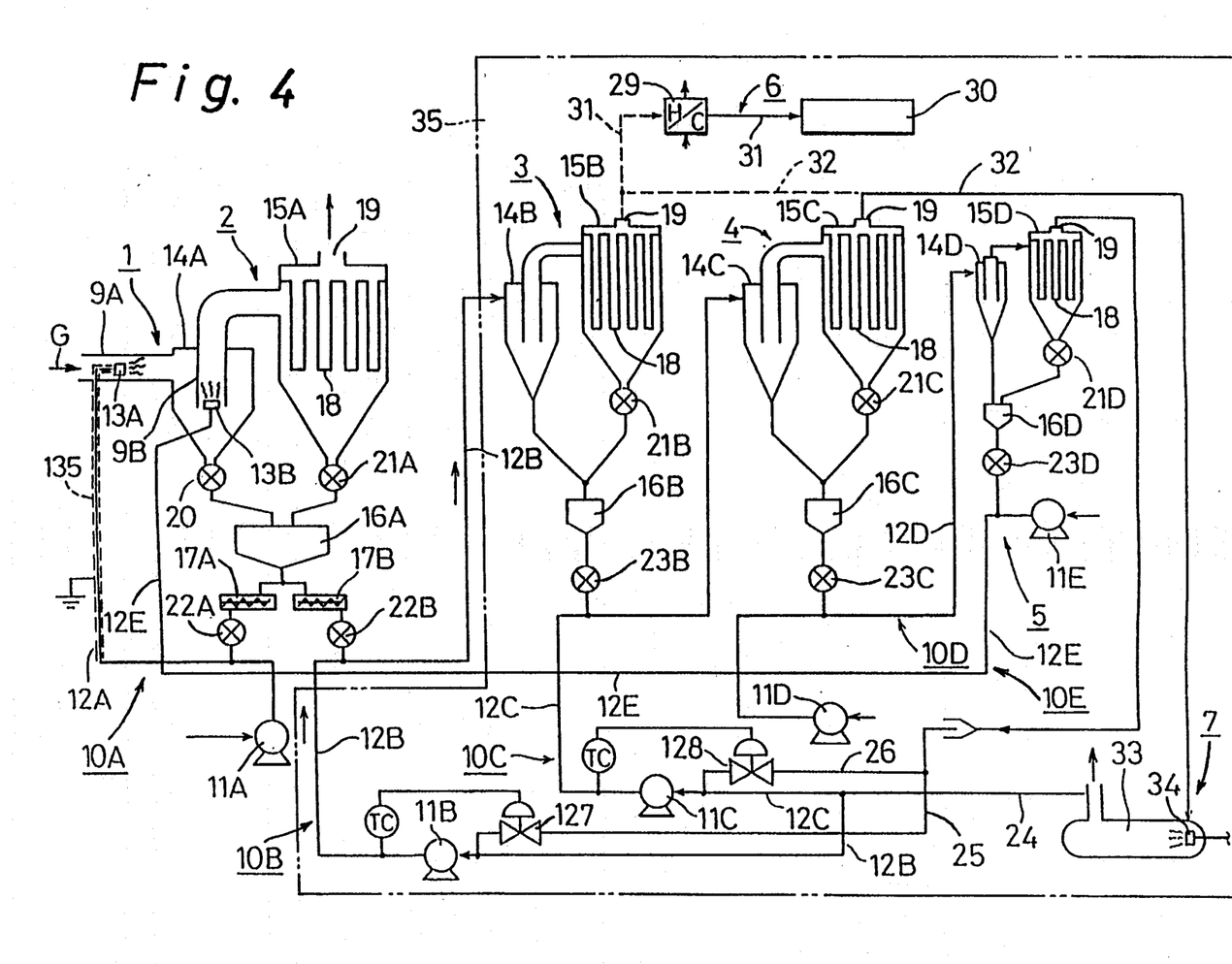
FIG. 4 is a system diagram of a third embodiment of the present invention.

FIG. 4 is a system diagram of an exhaust gas treatment apparatus showing a third embodiment of the present invention. The apparatus shown in FIG. 4 comprises adsorption pneumatic conveying means 1, separating means 2, low temperature heat treating means 3, high temperature heat treating means 4, adsorbent feeding means 5, and neutralizing and deodorizing treating means consisting of a first treating means 6 and a second treating means 7.

The adsorption pneumatic conveying means 1 comprises gas carrying lines 9A and 9B in which first and second adsorbent feeder nozzles 13A and 13B are respectively installed and through which an exhaust gas G, such as a paint exhaust gas, is transported. A first pneumatic conveying line 10A consists essentially of a pipeline 12A having a blower 11A. The exhaust gas G is pneumatically transported and is mixed with powdery adsorbent injected into the gas carrying line 9A from the first adsorbent feeder nozzle 13A, and flows into the downstream gas carrying line 9B where the exhaust gas G is mixed with adsorbent injected from the second adsorbent feeder nozzle 13B, the exhaust gas G then being direct further downstream. The exhaust gas G, containing the fine particles and the noxious and malodorous gas, is thus mixed with adsorbent, for example, hydrophobic zeolite, so that, during pneumatic conveyance, the fine particles are made to adhere to the surfaces of the zeolites while the noxious and malodorous gas is adsorbed into the pores of the zeolite.

The separating means 2 comprises a first dust collector realized by a first cyclone 14A, a second dust collector realized by the first bag filter 15A, a first receiver 16A, and two screw feeders 17A and 17B.

The gas carrying line 9B is centrally installed in the cylindrical body of the first cyclone 14A in a concentric relationship therewith, the gas carrying line 9B serving as an inner cylinder for exhaust. Attached to the upper part of the cylindrical wall of the body is the outlet end of the gas carrying line 9A, while in the bottom of the body there is provided an outlet at which a rotary valve 20 is installed. The first bag filter 15A consists of two chambers, an upper chamber and a lower chamber, separated by a filter assembly 18 comprising a plurality of bag-shaped filter cloths. In the top wall of the upper chamber, there is a discharge port 19, and to the upper part of the sidewall of the lower chamber is attached the outlet end of the gas carrying line 9B. In the bottom of the lower chamber there is provided an outlet at which a rotary valve 21A is installed.

The first receive 16A is disposed beneath the first cyclone 14A and the first bag filter 15A. Attached to the top wall of the receiver container are pipelines extending from the rotary valves 20 and 21A, while the bottom wall of the container is provided with an outlet. The screw feeders 17A and 17B are each constructed with a body in which a screw is rotatably mounted and which is provided with a charge port and a discharge port, the charge port being connected to the outlet of the receiver 16A via the pipeline. The discharge ports are respectively connected to halfway points along the pipeline 12A and a pipeline 12B described hereinafter by respective pipelines, in which pipeline rotary valves 22A and 22B are installed.

The rotary valves 20, 21A, 22A, and 22B are identical in construction. Each valve is a feeder having a structure capable of feeding the powder while a sealing function is performed. Double dampers having the same function can be used instead of the rotary valve.

The separating means 2 operates in the following manner. The fluid stream flowing through the gas carrying line 9A, i.e. the exhaust gas G mixed with the powdery adsorbent, flows into the first cyclone 14A in a direction parallel to a tangent to the cylindrical wall thereof, and spirals downward along the inner wall of the cylindrical body. While this is happening, the adsorbent, laden with the fine particles and the noxious and malodorous gas, is forced toward the wall by centrifugal force so that the adsorbent is separated from the exhaust gas G, purified to a certain level, and falls downward along the wall. In the meantime, the exhaust gas G separated from the adsorbent is drawn into the gas carrying line 9B from below, is mixed with the regenerated adsorbent injected from the adsorbent feeder nozzle 13B, and is fed into the lower chamber of the first bag filter 15A from above. On the other hand, the adsorbent, which has fallen downward and which still retains the ability to perform as an adsorbent, is fed into the first receiver 16A by the rotary valve 20. The fluid stream that has flown into the lower chamber of the first bag filter 15A, i.e. the exhaust gas G that contains unremoved adsorbent, is drawn across the filter assembly 18, which collected the adsorbent laden with fine particles and the noxious and malodorous gas. A negative pressure is applied to the filter assembly 18 to knock off the collected adsorbent, which then falls downward to the bottom of the chamber. On the other hand, the purified exhaust gas G is discharged to the atmosphere, or recovered, through the discharge port 19.

The powdery adsorbent that has fallen to the bottom of the chamber is fed through the rotary valve 21A into the first receiver 16A, where it is mixed with the adsorbent delivered through the rotary valve 20. The adsorbent collected in the first receiver 16A is separated between the screw feeders 17A and 17B, and is delivered through the rotary valves 22A and 22B, one for mixing the adsorbent with the air stream flowing through the pipeline 12A and the other for mixing the adsorbent with the hot blast stream flowing through the pipeline 12B described hereinafter. In this manner the separating means 2 separates the adsorbent and the exhaust gas, fed in the form of a mixture from the adsorption pneumatic conveying means 1, with most of the separated adsorbent being delivered to the low temperature heat treating means 3 and a portion of the adsorbent being returned to the adsorption pneumatic conveying means 1 so as to carry out the adhering and adsorbing treatment.

The low temperature heat treating means 3 comprises a second pneumatic conveying line 10B, consisting essentially of the pipeline 12B in which is installed a blower 11B, a second cyclone 14B, a second bag filter 15B, and a second receiver 16B. The pipeline 12B of the second pneumatic conveying line 10B is connected at its inlet end to a pipeline 24 carrying a hot blast stream and at a halfway point, near the suction side of the blower 11B, to a pipeline 25 carrying an ordinary temperature air stream. The outlet end of the pipeline 12B is connected to the upper part of the cylindrical body of the second cyclone 14B. A temperature control valve 127 is installed in the pipeline 25. The second cyclone 14B, the second bag filter 15B, and the second receiver 16B are equivalent in construction and arrangement to the first cyclone 14A, the first bag filter 15A, and the first receiver 16A in the separating means 2, and therefore detailed descriptions thereof are omitted herein. It should be noted, however, that a rotary valve 23B disposed on the outlet side of the second receiver 16B is connected via a pipeline to a halfway point of a pipeline 12C, carrying a hot blast stream and described hereinafter.

The low temperature heat treating means 3 operates in the following manner. The adsorbent, fully laden with fine particles and the noxious and malodorous gas, is delivered at a predetermined rate from the screw feeder 17B to the pipeline 12B of the second pneumatic conveying line 10B, where the adsorbent is mixed into the pneumatic stream, which is maintained at a low temperature, for example at 300° C., by the action of the temperature control valve 127. The resulting gas-solid mixture, with its temperature now lowered to about 200° C., is drawn into the second cyclone 14B. In the pipeline 12B, because the adsorbent is heated to about 200° C., the noxious and malodorous gas adsorbed herein is now desorbed. On the other hand, the fine particles adhering to the adsorbent are left adhered to the adsorbent, because the temperature is lower than their thermal decomposition temperature (400° to 500° C.). The flow rate of the pneumatic stream in the pipeline 12B can be as slow as 3 to 10m$^3$/hour to accomplish the above desorption, as compared with the flow rate of 100m$^3$/hour for the exhaust gas G flowing in the gas carrying line 9A. As a result, exhaust gas in a state of high concentration is delivered for treatment in the low temperature heat treating means 3. Therefore, the low temperature heat treating means 3, including the second bag filter 15B, can be accomplished by a small-sized apparatus.

The adsorbent, having been separated from the concentrated exhaust gas in the second cyclone 14B and fallen downward, is delivered to the second receiver 16B. On the other hand, the highly concentrated exhaust gas separated from the adsorbent is drawn into the lower chamber of the second bag filter 15B, where the remaining adsorbent is separated from the highly concentrated exhaust gas. The adsorbent that has fallen downward is fed through a rotary valve 21B into the second receiver 16B, while the highly concentrated exhaust gas passed through the filter assembly 18 is discharged through the discharge port 19 provided in the top wall of the upper chamber and introduced into the first treating means 6, described hereinafter.

The adsorbent collected in the second receiver 16B, still laden with fine particles, is delivered through the rotary valve 23B for mixing into a hot pneumatic stream flowing through a pipeline 12C of a third pneumatic conveying line 10C described hereinafter. As described, in the low temperature heat treating means 3, the adsorbent delivered from the separating means 2 is heated to a low temperature of 120° C. to 250° C. for the desorption of the noxious and malodorous gas and the noxious and malodorous gas separated from the adsorbent is introduced into the first treating means 6, whereas the adsorbent is delivered to the high temperature heat treating means 4.

The high temperature heat treating means 4 comprises a third pneumatic conveying line 10C, consisting essentially of a pipeline 12C in which a blower 11C is installed, a third cyclone 14C, a third bag filter 15C and a third receiver 16C. These component elements are equivalent in construction and arrangement to the second pneumatic conveying line 10B, the second cyclone 13C, the second bag filter 15B, and the second receiver 16B in the low temperature heat treating means 3, and therefore detailed descriptions thereof are omitted herein.

The operation of the high temperature heat treating means 4 will now be described. The adsorbent laden with fine particles is delivered from the second receiver 16B to the pipeline 12C of the third pneumatic conveying line 10C, where the adsorbent is mixed into the pneumatic stream, maintained at a high temperature, for example, at 600° C., and thus heated to 350° to 500° C. A pneumatic stream from a pipeline 26, which its temperature controlled by a temperature control valve 128, is mixed with the hot pneumatic stream of about 800° C. flowing in the pipeline 25 so that the hot pneumatic stream in the pipeline 12C is maintained at a constant temperature. The gas-solid mixture containing the adsorbent is carried in the pipeline 12C and drawn into the third cyclone 14C. In the process, the fine particles adhered to the adsorbent are thermally decomposed by the high temperatures in the pipeline 12C and the third cyclone 14C and removed from the adsorbent, thus regenerating the adsorbent. Most of the regenerated adsorbent is separated in the third cyclone 14C and fed from the bottom thereof in the third receiver 16C. On the other hand, the exhaust gas separated from the adsorbent is drawn into the lower chamber of the third bag filter 15C, where the remaining adsorbent and exhaust gas are completely separated, the adsorbent then falling downward and being fed by a rotary valve 21C into the third receiver 16C. The exhaust gas that has passed through the filter assembly 18 of the bag filter 15C is discharged through the discharge port 19 provided in the top wall of the upper chamber and introduced into the second treating means 7 described hereinafter.

The regenerated adsorbent collected in the third receiver 16C is delivered by a rotary valve 23C for mixing it into a pneumatic stream flowing through a pipeline 12D of the fourth pneumatic conveying line 10D in the adsorbent feeding means 5 described hereinafter. As described, in the high temperature heat treating means 4, the adsorbent delivered from the low temperature heat treating means 3 is heated to a high temperature of 350° to 600° C. to thermally decompose, and thus desorb, the mists and high-boiling point substances. The regenerated adsorbent is then delivered to the adsorbent feeding means 5, whereas the exhaust gas generated during the thermal decomposition process is introduced into the second treating means 7.

The adsorbent feeding means 5 comprises the fourth pneumatic conveying line 10D, consisting essentially of the pipeline 12D in which a blower 11D is installed, a fourth cyclone 14D, a fourth bag filter 15D, a fourth receiver 16D, and a fifth pneumatic conveying line 10E consisting essentially of a pipeline 12E in which a blower lie is installed. The fourth pneumatic conveying line 10D, the fourth cyclone 14D, the fourth bag filter 15D, and the fourth receiver 16D are equivalent in construction and arrangement to the second pneumatic conveying line 10B, the second cyclone 14B, the second bag filter 15B, and the second receiver 16B in the low temperature treating means 3, except that the carrier fluid is atmospheric air. Therefore, detailed descriptions of these component elements are omitted herein. The fourth and fifth pneumatic conveying lines 10D and 10E transport ordinary temperature atmospheric air drawn through the respective blowers 11D and 11E, and the outlet end of the pipeline 12E of the fifth pneumatic conveying line 10E is connected to the adsorbent feeder nozzle 13B installed inside the gas carrying line 9B.

The operation of the adsorbent feeding means 5 will now be described. The regenerated adsorbent of high temperature, collected in the third receive 16C, is fed by the rotary valve 23C in the pipeline 12D, where the adsorbent is cooled by mixing it with the ordinary temperature air stream, the resulting air-solid mixture then being drawn into the fourth cyclone 14D. In the cyclone 14D, the further cooled and regenerated adsorbent and the air are separated, and the air is drawn into the lower chamber of the fourth bag filter 15D while the regenerated adsorbent is forced downward and collected in the fourth receiver 16D. The air drawn into the lower chamber contains fine regenerated adsorbent left unremoved in the fourth cyclone 14D. In the fourth bag filter 15D, the remaining adsorbent and the air are completely separated, and the air is discharged to the atmosphere through the discharge port 19, while the regenerated adsorbent is forced downward and fed by the rotary valve 21A into the fourth receiver 16D. The regenerated adsorbent collected in the fourth receiver 16D is cooled and then fed through a rotary valve 23D into the pipeline 12E. The adsorbent is mixed with the ordinary temperature air stream in the pipeline 12E, which carries the adsorbent to the adsorbent to the adsorbent feeder nozzle 13B for injection into the gas carrying line 9B. Thus, in the adsorbent feeding means 5, the regenerated adsorbent of high temperature, fed from the high temperature heat treating means 4, is cooled in the fourth pneumatic conveying line 10D, the fourth cyclone 14D, and the fourth bag filter 15D, and the cooled and regenerated adsorbent separated from the air is returned through the fifth pneumatic conveying line 10E to the adsorbent pneumatic conveying means 1 where the adsorbent is reused for adsorbing the exhaust gas.

The fist treating means 6 comprises a cooler 29 and a solvent collecting device 30. The cooler 29 consists essentially of a heat exchanger, which is, for example, of a gas-to-liquid type, wherein the inlet end of a gas line is connected via a pipeline 31 to the discharge port 19 of the second bag filter 15B, while cooling water is circulated through a liquid line. The solvent collecting device 30 is realized by, for example, an adsorption type solvent collecting device, in which activated charcoal is used as an adsorbent. The inlet end of the device 30 is connected via the pipeline 31 to the outlet end of the gas line in the cooler 29.

The concentrated noxious and malodorous gas discharged from the discharge port 19 of the second bag filter 15B is cooled through the cooler 29 and fed into the adsorption type solvent collecting device 30 where the gas is adsorbed on activated charcoal. The noxious and malodorous gas is thus collected by adsorption in the first treating means 6.

The second treating means 7 comprises an oxidative cracker 33. The oxidative cracker 33 is constructed, for example, from a direct firing combustion furnace with a combustion burner 34 installed therein. The gas inlet port of the furnace is connected via a pipeline 32 to the discharge port 19 of the third bag filter 15C, while the exhaust port thereof is connected to a flue as well as the inlet end of the pipeline 24.

The exhaust gas discharged from the discharge port 19 of the third bag filter 15C is drawn through the pipeline 32 into the direct firing combustion furnace 33, where the exhaust gas is burned and neutralized. The neutralized exhaust gas is discharged to the atmosphere from the flue, while a portion thereof is drawn into the pipeline 24 and used as hot carrier gas in the second pneumatic conveying line 10B of the low temperature heat treating means 4 as well as in the third pneumatic conveying line 10C of the high temperature heat treating means 5, as previously described. In this manner, the second treating means 7 neutralizes the exhaust gas that was thermally decomposed and separated in the high temperature heat treating means 4, and recycles the high temperature gas, generated during the neutralizing and deodorizing process, for use as low temperature gas for the low temperature heat treating means 3 and also as high temperature gas for the high temperature heat treating means 4. For the oxidative cracker 33, a catalytic oxidization device may be used instead of the direct firing combustion furnace.

In this embodiment, the neutralizing and deodorizing treatment of the exhaust gas is accomplished by a two-step process, i.e. by the first treating means 6 and the second treating means 7. As an alternative arrangement, the first treating means 6 may be omitted, and the pipeline 32 may be further extended to connect to the discharge port 19 of the second bag filter 15B so that the exhaust gas separated in both the low temperature heat treating means 3 and the high temperature heat treating means 4 can be simultaneously treated. for neutralizing and deodorizing in the second treating means 7.

Also, in the high temperature heat treating means 4, indirect heating using a rotary kiln or a ribbon mixer may be performed.

In this embodiment, all of the powdery adsorbent treated by low temperature heating is subject to high temperature heating treatment. However, if the amount of the fine particles is extremely smaller than that of the gas, just a part of the powdery adsorbent treated by low temperature heating may be subject to high temperature heating treatment.

The adsorbing and adhering operation of the adsorbent pneumatic conveying means 1 of FIG. 4 will be described below. At the point where the first adsorbent feeder nozzle 13A is installed in the gas carrying line 9A, the exhaust gas is high in its content of fine particles and noxious and malodorous gas components, and these high concentration components need to be adsorbed and adhered as much as possible by the powdery adsorbent. The adsorbing and adhering process is performed until the concentration of each component is lowered, for example, from 100 ppm to 20 ppm. At this step, since the adsorbing and adhering process is performed for high concentration components, the adsorbent does not need to be regenerated to perform the job; an adsorbent lightly laden with contaminants can be safely reused for the process. On the other hand, at the point where the second adsorbent feeder nozzle 13B is installed in the gas carrying line 9B, the component concentration has been lowered, for example, to 20 ppm, and further adsorbing and adhering is required to be performed for such low concentration components. Therefore, purified and regenerated adsorbent is supplied from the adsorbent feeding means 5 to perform highly effective adsorbing and adhering. As a result, from the nozzles 13A to 13B, the exhaust gas of 20 ppm concentration, for example, can be purified to a virtually harmless state of 1 ppm.

The screw feeders 17a and 17b used in this embodiment may be replaced by other quantitative feeders such as spiral feeders or vibrating feeders. Also, double dampers may be used instead of rotary valves. The receivers 16B, 16C, and 16D are not essential components, but may be omitted.

When purifying the high concentration noxious and malodorous gas in the present invention, the adsorbent which is separated in the dust collecting apparatus 15A or is mixed after being separated by the cyclone 14A and the dust collecting apparatus 15A may be used.

Further, in the apparatus shown in FIG. 4, a first pneumatic conveying path 10A is formed as a pneumatic conveying means for charging.

The first pneumatic conveying path 10A, as the pneumatic conveying means for charging, has a blower 11A and a pipeline 12A as element members. The pipeline 12A is wholly or mostly composed or nonconductive materials such as ceramics and plastics, and its outer periphery is covered with a conductive material 135 such as metal mesh. The conductive material 135 is grounded or has its potential adjusted to zero. This pipeline 12A is formed such that the powdery adsorbent, such as hydrophobic zeolite, is pneumatically conveyed therethrough. This adsorbent collides with force with the pipeline's inner wall with simultaneous sliding contact with the air flow, this resulting in the generation of static electricity through friction and the adsorbent flowing therethrough being charged thereby.

It is preferable to use a bent pipe having many bends as the pipeline 12A to facilitate collision of the adsorbent.

This first pneumatic conveying path 10A conveys the adsorbent pneumatically as it is mixed into the air stream flowing through the pipeline 12A, and simultaneously causes it to be charged statically. The statically charged powdery adsorbent gushes out through the first nozzle 13A for the adsorbent.

Although in the third embodiment there is shown an example in which kinetic energy is used for electrostatically charging the adsorbent being pneumatically conveyed, it is also possible to directly charge the adsorbent by mixing ionized air into the adsorbent. Since, however, the equipment cost is bound to be quite high, it may as well be possible to charge part of the adsorbent to be supplied to the pneumatic conveying part for adsorption and supply it to the pneumatic conveying part for adsorption, preferably to the cyclone 14A.

Figure 5:
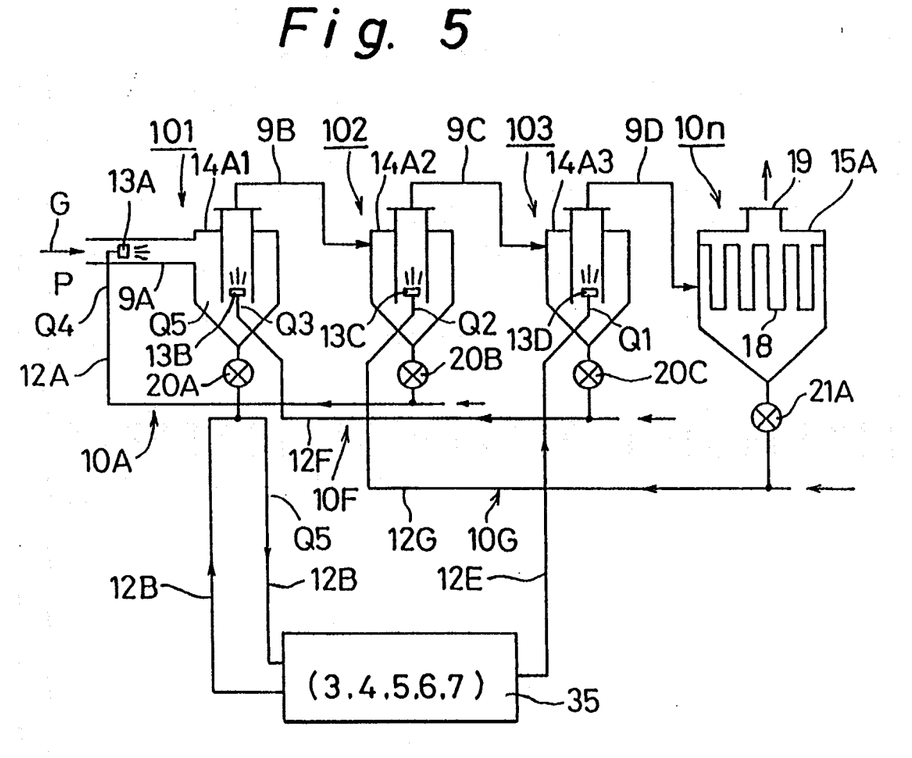
FIG. 5 is a system diagram of a fourth embodiment of the present invention.

FIG. 5 schematically illustrates an apparatus for treating exhaust gas of a fourth embodiment of the present invention. The apparatus of FIG. 5 includes dust collecting means consisting of plural, for example, four, dust collecting means 101, 102, 103 and 10n, regenerating means consisting of low temperature heat treating means 3 and high temperature heat treating means 4, adsorbent supplying means (adsorbent supply unit) 5, neutralizing and deodorizing means consisting of first treating means 6 and second treating means 7, and pneumatic conveying means consisting of plural, for example, two, intermediate pneumatic conveying means 10A and 10F.

In this embodiment, since the construction and operation of the low temperature heat treating means 3, the high temperature heat treating means 4, the adsorbent supply unit 5, the first treating means 6 and the second treating means 7 are the same as those mentioned in the third embodiment, the explanations thereof are omitted. Further, detailed drawings of such means as mentioned above are omitted by using reference number 35, which shows a regeneration device consisting of means 3–7.

The first dust collecting means 101 includes a gas conduit 9A through which gas G, such as a coating exhaust gas, passes, a first adsorbent nozzle 13A disposed in the gas conduit 9A, and a first cyclone separate 14A1 for collecting adsorbent. Incombustible powdery adsorbent injected from the first adsorbent nozzle 13A is mixed with the exhaust gas G flowing in the gas conduit 9A, and the exhaust gas G containing the solid is supplied into the first cyclone separator 14A1.

In the first cyclone separate 14A1, an exhaust cylinder is concentrically disposed on the center of a cylindrical body. One end of the gas conduit 9A is connected to the upper portion of the wall of the cylindrical body, and a rotary valve 20A is attached to an outlet extending from the bottom wall of the cylindrical body.

Operation of the first dust collecting means 101 is described hereinafter. The gas G mixed with the powdery adsorbent flows through the gas conduit 9A into the cylindrical body of the first cyclone separate 14A1 and spirally falls along the inner wall of the cylindrical body. While the exhaust gas G flows through the gas conduit 9A and the cylindrical body of the first cyclone separate 14A1, the noxious and malodorous gas in the exhaust gas G is efficiently adsorbed by the adsorbent mixed with the exhaust gas G, which has been partly purified, by means of centrifugal force, further falls along the inner wall of the first cyclone separator 14A1, and is exhausted into a conduit 12B via the rotary valve 20A. The partly purified exhaust gas G, on the other hand, flows upward into the exhaust cylinder in the center of the first cyclone separator 14A1 and is mixed with the powdery adsorbent injected from a second adsorbent nozzle 13B disposed in the exhaust cylinder. The adsorbent falls along the inner wall and is exhausted into the conduit 12B via the rotary valve 20A.

The second dust collecting means 102 includes a gas conduit 9B and a second cyclone separator 14A2. The gas conduit 9B and the second cyclone separator 14A2 have virtually the same structures as the gas conduit 9A and the first cyclone separator 14A1, respectively, so the same reference numbers are given to corresponding parts. The gas conduit 9B connects the exhaust cylinder of the first cyclone separator 14A1 to an exhaust gas inlet on the upper portion of the wall of the second cyclone separator 14A2. The second dust collecting means 102 is accordingly coupled with the first dust collecting means 101 in series.

Operation of the second dust collecting means 102 is described hereinafter. The exhaust gas G mixed with the powdery adsorbent in the exhaust cylinder of the first dust collecting means 101 is further purified by the adsorbent while flowing through the gas conduit 9B. The further purified exhaust gas G is then separated from the adsorbent, which has adsorbed the noxious and malodorous gas in the exhaust gas G, by means of centrifugal force in the second cyclone separator 14A2. The exhaust gas G flows upward into an exhaust cylinder disposed on the center of the second cyclone separator 14A2 and is mixed with powdery adsorbent injected from a third adsorbent nozzle 13C disposed in the exhaust cylinder, while the adsorbent falls along the inner wall of the second cyclone separator 14A2, is exhausted into a conduit 12A of the first intermediate pneumatic conveying means 10A via the rotary valve 20B, and then is injected from the first adsorbent nozzle 13A.

The third dust collecting means 103 includes a gas conduit 9C and a third cyclone separator 14A3. The gas conduit 9C and third cyclone separator 14A3 have virtually the same structures as the gas conduit 9A and the first cyclone separator 14A1, respectively, so the same reference numbers are given to corresponding parts. The gas conduit 9C connects the exhaust cylinder of the second cyclone separator 14A2 to a gas inlet on the upper portion of the wall of the third cyclone separator 14A3. The second dust collecting means 103 is accordingly coupled with the second dust connecting means 102 in series.

Operation of the third dust collecting means 103 is described hereinafter. The exhaust gas G mixed with the powdery adsorbent in the exhaust cylinder of the second dust collecting means 102 is further purified by the adsorbent while flowing through the gas conduit 9C. The further purified exhaust gas G is then separated from the adsorbent, which has adsorbed the noxious and malodorous gas in the exhaust gas G, by means of centrifugal force in the third cyclone separator 14A3. The exhaust gas G flows upward into an exhaust cylinder disposed in the center of the third cyclone separator 14A3 and is mixed with powdery adsorbent injected from a fourth adsorbent nozzle 13D disposed in the exhaust cylinder, while the adsorbent falls along the inner wall of the third cyclone separator 14A3, is exhausted into a conduit 12F of the first intermediate pneumatic conveying means 10A via the rotary valve 20C, and is then injected from a first adsorbent nozzle 13A.

The last dust collecting means $10n$ includes a gas conduit 9D though which the gas exhaust G passes, similar to the gas conduits 9A, 9B and 9C, and a first bag filter 15A for collecting adsorbent like the first, the second and the third cyclone separators 14A1, 14A2 and 14A3.

The first bag filter 15A is divided into two chambers, that is, an upper chamber and a lower chamber, by a filter assembly 18 formed of a plurality of bag shaped filter cloths. An exchange port 19 is formed on the top of the upper chamber. The outlet end of the gas conduit 9D is connected to the upper portion of the side wall of the lower chamber, and the inlet end of the gas conduit 9D is connected to the exhaust cylinder of the third cyclone separator 14A3. A rotary valve 21A is attached to an outlet extending from the bottom wall of the lower chamber. The last dust collecting means $10n$ is accordingly coupled with the third dust collecting means 103 in series.

The operation of the last dust collecting means $10n$ is described hereinafter. The exhaust gas G mixed with the powdery adsorbent in the exhaust cylinder of the third dust collecting means 103 is further purified by the adsorbent while flowing through the gas conduit 9D. The exhaust gas G containing the adsorbent is then supplied to the lower chamber of the first bag filter 15A. The purified exhaust gas G passes through filter assembly 18 and is exhausted to the atmosphere via the exchange port 19 or is collected, while the adsorbent is collected by the filter assembly 18, is dropped to the bottom of the lower chamber by means of a reverse pressure, is exhausted into a conduit 12G via the rotary valve 21A, and is then injected from the third adsorbent nozzle 13C.

Figure 6:
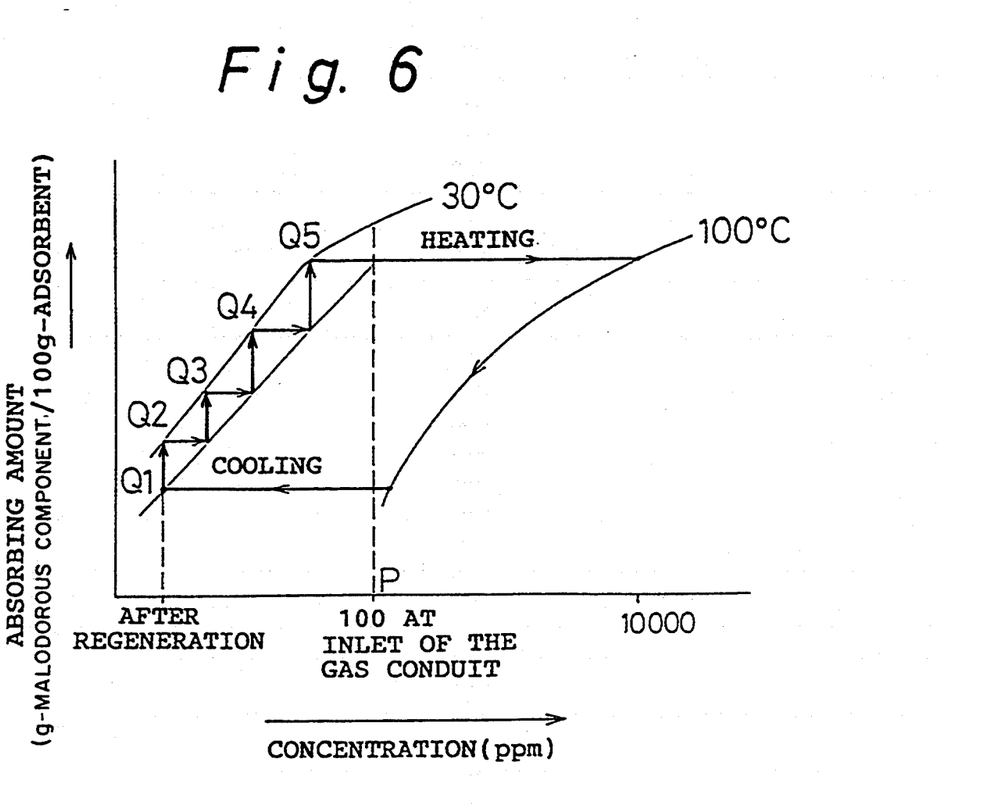
FIG. 6 is an isotherm adsorption diagram of the fourth embodiment shown in FIG. 5.

FIG. 6 is an isotherm adsorption diagram showing the relationship between the concentration of gas components and the adsorbed quantity. FIG. 6 is correspondent with the adsorbing operation of the fourth embodiment as shown in FIG. 5.

This relationship is described according to FIG. 5 and FIG. 6. The concentration P of gas components to be treated in the exhaust gas G is assumed to be 100 ppm at an inlet of the gas conduit 9A. When the gas exhaust G is brought into contact with adsorbent (adsorbed quantity Q4) injected from the first adsorbent nozzle 13A, the gas components are adsorbed in the adsorbent and the quantity adsorbed in the adsorbent increased to Q5.

The adsorbent (adsorbed quantity Q5) is transferred to the regeneration device 35 and regenerated by the heat treatment as the cleanest powdery adsorbent of the smallest adsorbed quantity Q1. The cleanest adsorbent is cooled and supplied into a bag filter 15A of the last dust collecting means $10n$ to be brought into contact with the purified exhaust gas G containing only a small amount of the target gas components. The adsorbent increases its adsorption quantity to Q2 through this adsorption and is supplied to a third cyclone separator 14A3 of the third dust collecting means 103.

The adsorbent increases the adsorbed quantity from Q2 to Q3 through adsorption in the third cyclone separator 14A3, and is then supplied to the second cyclone separator 14A2 of the second dust collecting means 102. The adsorbent then increases the adsorbed quantity from Q3 to Q4through the adsorption in the second cyclone separator 14A2, and is then supplied to the gas conduit 9A connected to the first dust collecting means 101.

As described above, the adsorbent used and separated in the second, third, and last dust collecting means 102, 103 and 10n is recycled to the prior dust collecting means 101, 102, and 103, respectively, whereas the adsorbent used and separated in the first dust collecting means 101 is regenerated and recycled to the last dust collecting means 10n. The powdery adsorbent is thus virtually in countercurrent contact with the exhaust gas G, and has a high adsorption efficiency. The regenerating means can efficiently regenerate the tainted adsorbent, and the same amount of adsorbent is brought into contact with the exhaust gas G in all of the dust collecting means 101 to 10n.

Further, in regenerating powdery adsorbent by heat treatment, in the present invention, the powdery adsorbent may be indirectly heated by indirect heating means, or the gas for heating may be brought into contact directly with the powdery adsorbent as the heat treatment.

As described herein, the present invention may be used not only for treating exhaust gas generated in an automobile coating process, printing process, steel pipe manufacturing process, etc., but also in various specific areas relevant to other purposes.

I claim:

1. An apparatus for treating an exhaust gas containing particles that comprise organic compounds as a component and a noxious and malodorous gas, comprising:
   a powdery adsorbent;
   a means for mixing the powdery adsorbent with an exhaust gas so as to adhere particles of the exhaust gas to the powdery adsorbent and so as to have the powdery adsorbent adsorb a noxious and malodorous gas component of the exhaust gas and for separating the powdery adsorbent having the particles adhered thereto and the noxious and malodorous gas adsorbed thereby from the exhaust gas after the exhaust gas has been at least partially purified;
   a means for regenerating the powdery adsorbent that has been separated, said means for regenerating being connected with said means for mixing and separating, and said means for regenerating comprising a first heating means for heating the powdery adsorbent at a first temperature sufficient to have the noxious and malodorous gas desorbed from the powdery adsorbent and a second heating means for heating the powdery adsorbent treated by said first heating means at a second temperature sufficient to thermally decompose the particles, wherein the first temperature is substantially lower than the second temperature; and
   means connected between said means for mixing and separating and said means for regenerating for conveying the regenerated powdery adsorbent from said means for regenerating to said means for mixing and separating.

2. The apparatus of claim 1, wherein said first heating means is constructed and arranged for heating the powdery adsorbent at the first temperature, from about 120° C. to about 250° C., and said second heating means is constructed and arranged for heating the powdery adsorbent at the second temperature, from about 350° C. to about 600° C.

3. The apparatus of claim 1, wherein at least one of said first heating means and said second heating means comprises means for heating the powdery adsorbent by mixing the powdery adsorbent with a heated gas for regeneration of the powdery adsorbent.

4. The apparatus of claim 1, wherein the powdery adsorbent is a hydrophobic zeolite powder.

5. The apparatus of claim 1, wherein said means for mixing and separating comprises a cyclone for separating powdery adsorbent from the exhaust gas and a bag filter for separating powdery adsorbent from the exhaust gas.

6. The apparatus of claim 1, wherein said means for mixing and separating comprises a bag filter for separating the powdery adsorbent from the exhaust gas.

7. The apparatus of claim 1, wherein said means for regenerating comprises a plurality of cyclones and a plurality of bag filters, with each of said cyclones being connected with a respective one of said bag filters, and the pairs of cyclones and bag filters being connected in series.

8. The apparatus of claim 1, wherein said means for mixing and separating comprises a means for electrostatically charging the powdery adsorbent conveyed to said means for mixing and separating by said means for conveying.

9. The apparatus of claim 1, and further comprising:
   a means for detoxifying and deodorizing the noxious and malodorous gas desorbed by said means for regenerating, said means for detoxifying and deodorizing comprising at least one of an adsorption collection device and an oxidative degradation device.

10. An apparatus for treating an exhaust gas containing fine particles that comprise organic compounds as a component and a noxious and malodorous gas, comprising:
    a powdery adsorbent;
    a means for mixing the powdery adsorbent with an exhaust gas so as to adhere particles of the exhaust gas to the powdery adsorbent and so as to have the powdery adsorbent adsorb a noxious and malodorous gas component of the exhaust gas;
    a means for separating powdery adsorbent having the particles adhered thereto and the noxious and malodorous gas adsorbed thereby from the exhaust gas after the exhaust gas has been at least partially purified, said means for separating comprising a first dust separator connected in series with a second dust separator, said first dust separator being connected to said means for mixing in order to receive mixed powdery adsorbent and exhaust gas from said means for mixing, and said second dust separator being connected with said means for mixing in order to supply powdery adsorbent separated by said second dust separator to said means for mixing;
    a means for regenerating the powdery adsorbent separated by said first dust separator by heating the powdery adsorbent so as to remove the noxious and malodorous gas and the fine particles therefrom so as to obtain a regenerated powdery adsorbent; and
    a means for conveying the regenerated powdery adsorbent from said regenerating means to said second dust separator.

11. An apparatus for treating an exhaust gas containing particles that comprise organic compounds as a component and a noxious and malodorous gas, comprising:
    a powdery adsorbent;

a means for mixing the powdery adsorbent with an exhaust gas so as to adhere particles of the exhaust gas to the powdery adsorbent and so as to have the powdery adsorbent adsorb a noxious and malodorous gas component of the exhaust gas and for separating powdery adsorbent having the particles adhered thereto and the noxious and malodorous gas adsorbed thereby from the exhaust gas after the exhaust gas has been at least partially purified, said means for mixing and separating comprising at least three dust separators connected in series with each other, wherein each of said dust separators has an inlet and a powdery adsorbent outlet, and wherein each powdery adsorbent outlet of said dust separators, except for the first of said dust separators in series, is connected to the inlet of a preceding one of said dust separators in series;

a means connected to said powdery adsorbent outlet of the first of said dust separators for regenerating the powdery adsorbent therefrom by heating the powdery adsorbent so as to remove the noxious and malodorous gas and the particles therefrom so as to obtain a regenerated powdery adsorbent; and a means for conveying the regenerated powdery adsorbent from said means for regenerating to the inlet of the last of said dust separators in series.

12. An apparatus for treating an exhaust gas containing particles that comprise organic compounds as a component and a noxious and malodorous gas, comprising:

an adsorbent;

an exhaust gas line;

an adsorbent feeding arrangement connected to said exhaust gas line for feeding the adsorbent into said exhaust gas line;

an adsorbent separator connected to said exhaust gas line by an exhaust gas inlet thereof downstream of said adsorbent feeding arrangement, said adsorbent separator further comprising an exhaust gas outlet and an adsorbent outlet;

an adsorbent regenerator connected to said adsorbent outlet of said adsorbent separator, said adsorbent regenerator comprising a first heat treating section connected to said adsorbent outlet and a second heat treating section connected to said first heat treating section and having a regenerated adsorbent outlet; and an adsorbent conveyor connecting said regenerated adsorbent outlet and said adsorbent feeding arrangement for conveying regenerated adsorbent to said feeding arrangement.

13. The apparatus of claim 12, wherein said regenerator further comprises a heated gas supply connected to said first heating section and said second heating section for supplying heated gas thereto.

14. The apparatus of claim 12, wherein said adsorbent separator comprises a cyclone connected to said exhaust gas line and defining said exhaust gas inlet, said cyclone having a gas outlet and a cyclone adsorbent outlet, and a bag filter defining having a gas outlet said exhaust gas outlet, said bag filter having a bag filter inlet connected to said gas outlet of said cyclone and a bag filter adsorbent outlet, said cyclone adsorbent outlet and said bag filter adsorbent outlet being connected to said adsorbent outlet of said adsorbent separator.

15. The apparatus of claim 14, wherein said adsorbent feeding arrangement comprises a first adsorbent feeding nozzle in said exhaust gas line and a second adsorbent feeding nozzle in said gas outlet of said cyclone.

16. The apparatus of claim 15, wherein said first and second adsorbent feeding nozzles are connected to said adsorbent outlet of said adsorbent separator and said adsorbent conveyor, respectively.

17. The apparatus of claim 12, wherein each of said first and second sections of said adsorbent regenerator comprises a heated air pneumatic conveyor connected to a cyclone and a bag filter.

18. The apparatus of claim 12, wherein said adsorbent regenerator has at least one gas outlet and the apparatus further comprises at least one of an adsorptive solvent collecting device and an oxidative cracker connected to said at least one gas outlet of said adsorbent regenerator.

19. A method of treating an exhaust gas containing particles that comprise organic compounds as a component and a noxious and malodorous gas, said method comprising the steps of:

mixing a powdery adsorbent with an exhaust gas containing particles that comprise organic compounds as a component and a noxious and malodorous gas at a first location so as to adhere the particles of the exhaust gas to the powdery adsorbent and so as to have the powdery adsorbent adsorb the noxious and malodorous gas component of the exhaust gas;

separating the powdery adsorbent having the particles adhered thereto and the noxious and malodorous gas adsorbed thereby from the exhaust gas after the exhaust gas has been at least partially purified;

regenerating the powdery adsorbent that has been separated from the exhaust gas by first heating the powdery adsorbent at a first temperature sufficient to have the noxious and malodorous gas desorbed from the powdery adsorbent and then heating the powdery adsorbent at a second temperature sufficient to thermally decompose the particles, the second temperature being higher than the first temperature, such that regenerated powdery adsorbent results at a second location; and conveying the regenerated powdery adsorbent from the second location to the first location for use in said step of mixing.

20. The method of claim of 19, wherein the first temperature is 120° to 250° C. and the second temperature is 350° to 600° C.

21. The method of claim 19, wherein in said step of regenerating both the first heating and the second heating are carried out by mixing the powdery adsorbent with a heated gas for regeneration of the powdery adsorbent.

22. The method of claim 19, wherein the powdery adsorbent is a hydrophobic zeolite powder.

23. The method of claim 19, wherein said step of mixing further comprises electrostatically charging the powdery adsorbent.

24. The method of claim 19, and further comprising the step of detoxifying and deodorizing the noxious and malodorous gas desorbed in said step of regenerating.

* * * * *